(12) United States Patent
Landwehr et al.

(10) Patent No.: US 10,717,681 B2
(45) Date of Patent: Jul. 21, 2020

(54) METHOD OF MAKING A CERAMIC MATRIX COMPOSITE (CMC) COMPONENT INCLUDING A PROTECTIVE CERAMIC LAYER

(71) Applicant: Rolls-Royce Corporation, Indianapolis, IN (US)

(72) Inventors: Sean Erin Landwehr, Avon, IN (US); Benjamin John Bowin Lai, Indianapolis, IN (US); Adam Lee Chamberlain, Mooresville, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 737 days.

(21) Appl. No.: 14/958,180

(22) Filed: Dec. 3, 2015

(65) Prior Publication Data

US 2016/0159066 A1    Jun. 9, 2016

Related U.S. Application Data

(60) Provisional application No. 62/088,077, filed on Dec. 5, 2014.

(51) Int. Cl.
*B32B 38/00* (2006.01)
*C04B 37/00* (2006.01)
(Continued)

(52) U.S. Cl.
CPC ............ *C04B 37/005* (2013.01); *B29C 70/00* (2013.01); *C04B 35/565* (2013.01);
(Continued)

(58) Field of Classification Search
CPC ..... B32B 38/0036; B32B 38/08; B32B 38/10; B32B 37/02; B32B 37/16; B32B 18/00; C04B 37/005
See application file for complete search history.

(56) References Cited

U.S. PATENT DOCUMENTS

| | | | | |
|---|---|---|---|---|
| 5,840,221 A | * | 11/1998 | Lau | B28B 1/265 264/29.7 |
| 6,733,907 B2 | * | 5/2004 | Morrison | B32B 18/00 416/241 B |

(Continued)

OTHER PUBLICATIONS

Poerschke, D.L. et al., "Yttrium Bearing Silicon Carbide Matrices for Robust Ceramic Composites," *J. Am. Cer. Soc.* vol. 96 (4) (2013) pp. 1300-1308.

*Primary Examiner* — Nathan H Empie
(74) *Attorney, Agent, or Firm* — Brinks Gilson & Lione

(57) ABSTRACT

A method of preparing a ceramic matrix composite (CMC) component that includes a protective ceramic layer comprises adhering at least one flexible ceramic tape to a ceramic fiber preform, where the at least one flexible ceramic tape comprises ceramic particles dispersed in an organic binder phase. After the adhering, the at least one flexible ceramic tape is heated to a temperature sufficient to volatilize the organic binder phase, thereby forming a porous ceramic layer on at least a portion of the ceramic fiber preform. After the heating and volatilizing, the ceramic fiber preform and the porous ceramic layer are infiltrated with a molten material, thereby forming a CMC component including, on at least a portion thereof, a protective ceramic layer.

16 Claims, 3 Drawing Sheets

(51) Int. Cl.
*C04B 35/80* (2006.01)
*B29C 70/00* (2006.01)
*C04B 35/565* (2006.01)

(52) U.S. Cl.
CPC .......... *C04B 35/806* (2013.01); *C04B 37/008* (2013.01); *B32B 2315/02* (2013.01); *C04B 2235/3804* (2013.01); *C04B 2235/3813* (2013.01); *C04B 2235/3817* (2013.01); *C04B 2235/3826* (2013.01); *C04B 2235/3839* (2013.01); *C04B 2235/428* (2013.01); *C04B 2235/5244* (2013.01); *C04B 2235/612* (2013.01); *C04B 2235/616* (2013.01); *C04B 2235/75* (2013.01); *C04B 2237/365* (2013.01); *C04B 2237/38* (2013.01); *C04B 2237/61* (2013.01); *C04B 2237/68* (2013.01); *C04B 2237/704* (2013.01); *C04B 2237/76* (2013.01); *C04B 2237/86* (2013.01)

(56) References Cited

U.S. PATENT DOCUMENTS

| | | | |
|---|---|---|---|
| 2004/0191411 A1* | 9/2004 | Hornor | C04B 35/573 427/228 |
| 2005/0281945 A1* | 12/2005 | Matsumoto | C04B 35/565 427/180 |
| 2006/0043628 A1 | 3/2006 | Matsumoto | |
| 2006/0140771 A1* | 6/2006 | Carper | C04B 35/565 416/241 R |
| 2007/0054169 A1* | 3/2007 | Day | H01M 4/9033 429/482 |
| 2007/0092762 A1 | 4/2007 | Corman et al. | |
| 2009/0162674 A1* | 6/2009 | Boutwell | F01D 5/288 428/447 |
| 2010/0279845 A1 | 11/2010 | Kebbede et al. | |
| 2011/0071013 A1* | 3/2011 | Newton | C04B 35/5622 501/95.2 |
| 2013/0167374 A1 | 7/2013 | Kirby et al. | |
| 2013/0287941 A1 | 10/2013 | Gray | |
| 2014/0093381 A1* | 4/2014 | Delvaux | F01D 5/282 416/230 |
| 2014/0271161 A1 | 9/2014 | Lazur | |
| 2014/0272248 A1 | 9/2014 | Chamberlain | |
| 2014/0272377 A1 | 9/2014 | Chamberlain | |

* cited by examiner

METHOD OF MAKING A CERAMIC MATRIX COMPOSITE (CMC) COMPONENT INCLUDING A PROTECTIVE CERAMIC LAYER

RELATED APPLICATIONS

The present patent document claims the benefit of priority under 35 U.S.C. § 119(e) to U.S. Provisional Patent Application No. 62/088,077, filed on Dec. 5, 2014, and hereby incorporated by reference in its entirety.

TECHNICAL FIELD

The present disclosure relates to ceramic matrix composite preparation and more particularly, to a method of preparing a ceramic matrix composite (CMC) component including a protective ceramic layer.

BACKGROUND

Due to their low weight and higher temperature capability relative to metal-based materials, ceramic-based materials have been used in demanding environments, such as for components operating at very high temperatures. For protection, such components may benefit from environmental barrier coatings to prevent environmental ingress and damage. Without a sufficient and suitable surface protection, ceramic matrix composites may degrade and lead to failure of the components.

BRIEF SUMMARY

A method of preparing a ceramic matrix composite (CMC) component including a protective ceramic layer entails adhering at least one flexible ceramic tape to a ceramic fiber preform, where the at least one flexible ceramic tape comprises ceramic particles dispersed in an organic binder phase. After the adhering, the at least one flexible ceramic tape is heated to a temperature sufficient to volatilize the organic binder phase, thereby forming a porous ceramic layer on at least a portion of the ceramic fiber preform. After the heating and volatilizing, the ceramic fiber preform and the porous ceramic layer are infiltrated with a molten material, thereby forming a CMC component including, on at least a portion thereof, a protective ceramic layer.

A flexible ceramic tape comprises SiC powder, one or more ceramic component additives, and an organic binder phase, where the one or more ceramic component additives are selected from the group consisting of rare earth borides, hafnium borides, rare earth carbides, and hafnium carbides. The organic binder phase may include one or more components selected from the group consisting of: at least one surfactant or dispersant, at least one organic binder, and at least one plasticizer.

DETAILED DESCRIPTION

Figure 1:
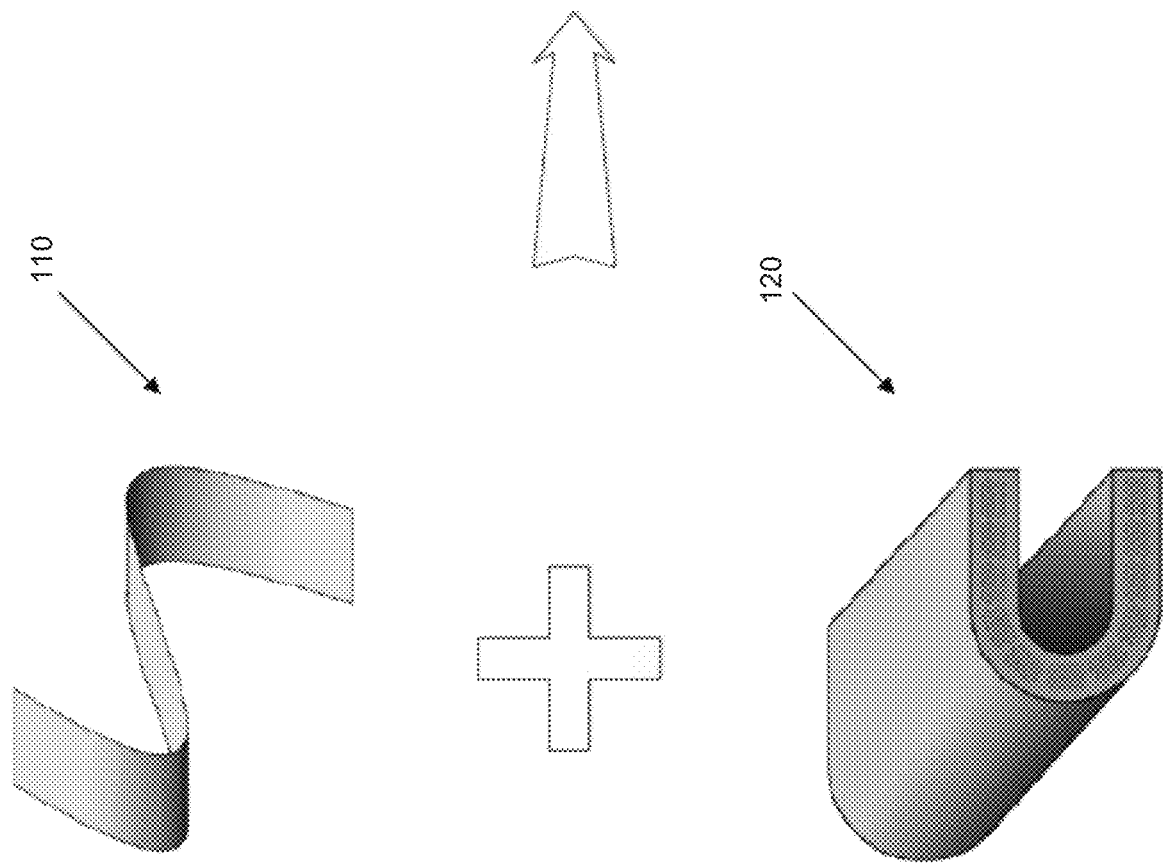
FIG. 1 shows schematic representation of the overlay of a ceramic matrix composite component with a single layer of flexible ceramic tape.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

FIG. 1 shows a schematic representation of an overlay of a ceramic fiber preform 120 with a layer of flexible ceramic tape 110 to produce a CMC component 130 with a protective ceramic layer 140. While the ceramic fiber preform 120, the flexible tape 110 and the CMC component 130 with an overlay of tape are depicted with simplified schematics for illustration purposes, it should be understood that none is limited to the particular configurations shown in FIG. 1. For example, in some embodiments, the flexible ceramic tape 110, which may be referred to as a flexible tape layer 110, may be overlaid over just a portion or all of the surfaces of the ceramic fiber preform 120.

In some embodiments, a flexible tape layer 110 is overlaid on an already formed CMC component, and in some embodiments, the flexible layer 110 is formed as an overlayer to the ceramic fiber preform 120 during, before or after different stages of the processing to fabricate the CMC component 130. For example, the flexible tape layer 110 may be formed as an overlayer to a ceramic fiber preform 120 during the final stages of the CMC component 130 fabrication process. For example, the tape layer may be applied following the stage of the CMC component fabrication process that increases the rigidity of the ceramic fiber preform 120 (e.g., coating or rigidizing of the fiber preform by chemical vapor deposition (CVD), chemical vapor infiltration (CVI), pyrolysis, chemical reaction, sintering, electrophoretic deposition, or another suitable deposition method. In some embodiments, the tape layer may be applied following or in tandem with the stage of the process that allows a ceramic matrix material slurry (e.g., particles of silicon carbide (SiC) or silicon/silicon carbide (Si/SiC)) to infiltrate the porosity in a coated (or uncoated) fiber preform (e.g., a preform made from ceramic fibers comprising SiC, carbon, alumina, or mullite). Examples of such a stage of CMC fabrication processes are slurry infiltration, slip casting, etc. In some embodiments, the above applications of the flexible tape layer may be performed prior to the silicon melt infiltration process that allows molten silicon to fill the porosity in the rigidized fiber preforms (e.g., the remaining porosity after the slurry infiltration). Various stages of CMC fabrication and/or processing have been described in U.S. patent application Ser. Nos. 14/097,857, 14/141,969 and 14/141,976, all of which are incorporated by reference herein in their entireties. In some embodiments, the CMC component may be only partially ceramic based. For example, the matrix composite may be formed from one or more of polymers, ceramics, intermetallics, certain metals, etc.

After heating to a temperature sufficient to volatilize the organic binder phase and densifying during melt infiltration, the flexible ceramic tape layer 110 becomes a protective ceramic layer 140 that may provide protection to the fibers in the CMC component 130 from environmental ingress and machining practices that may cause environmental exposure of the fibers and lead to degradation. The application of a tape overlay 110, in whole or in part, to a ceramic fiber preform 120 during fabrication of a CMC component may provide a buffer layer 140 to the SiC fibers, and may allow for machining processes to dimensional tolerance with little or no adverse effects to the mechanical integrity of the composite fibers. In some embodiments, the buffer layer or protective ceramic layer 140 allows for simplified compositional modification of the CMC component. In other words, as discussed further below, the composition of the protective ceramic layer 140 may be different than the ceramic matrix of the CMC component 130.

The flexible ceramic tape 110 is fabricated using ceramic materials such as, but not limited to, SiC. In some embodiments, the ceramic material may be a SiC powder, wherein the powder may comprise SiC particles of varied sizes. The flexible ceramic tape 110 may also include, in some cases, one or more preceramic polymers that may be converted to SiC during processing. In some embodiments, the powder may also comprise other additives. For example, the powder may comprise one or more rare earth borides (e.g., $YB_6$, $YB_2$), rare earth carbides (e.g., $YC_2$), hafnium borides (e.g., $HfB_2$), hafnium carbides (e.g., $HfB_2$), and/or the like. Such a combination comprising SiC, and one or more carbides and/or borides may result in the formation a more water vapor resistant silicate and/or borosilicate than the $SiO_2$ that inherently forms from Si and/or SiC in CMC components during use; thus, use of the flexible tape layer 110 during fabrication to can lead to a CMC component 130 that is better protected during end use conditions. In some preferred embodiments, the SiC powder may comprise about 50% to about 60% of the as-cast flexible tape layer by volume, i.e., about 50% to about 60% by volume of the tape layer after its formation (e.g., after some additives are removed with the formation of the tape layer as will be discussed below). In some embodiments, the SiC particulates in the ceramic powder may have a distribution of particle sizes.

The ceramic powder comprising SiC and, in some embodiments, one or more additional ceramic component additives, such as rare earth and hafnium borides and carbides, are mixed with a solvent or liquid vehicle that is capable of suspending the ceramic powder. Such liquid vehicles may possess other desirable qualities for forming the ceramic tape layer, such as acceptable drying characteristics and/or drying rates when a slurry comprising the solvent is heated up to form a tape layer. Examples of liquid vehicles that may be used in preparing a slurry composition for a ceramic tape layer include water, ethanol, methyl ethyl ketone, or others, as well as combinations thereof. Any preceramic polymers used in addition to the ceramic powder may also be incorporated into the slurry composition.

A surfactant and/or a dispersant may also be added to the slurry composition to aid with dispersing the ceramic particles, leading to reduced settling and/or clumping. For example, surfactants and/or dispersants with low molecular weight, such as but not limited to polyvinyl alcohol, BYK®-110 (a dispersing additive comprising phosphoric acid polyester from RYK Additives and Instruments Company), etc., may be used to disperse suspended particles in the slurry. In most embodiments, these additives, i.e., surfactants and/or dispersants, may occur in the slurry composition in low concentrations. For example, in some embodiments, the surfactants and/or dispersants may comprise less than about 2% by volume of the as-cast flexible tape layer, i.e., less than about 2% by volume of the tape layer after some additives are removed after the formation of the tape layer. In some embodiments, the surfactants and/or dispersants may comprise less than about 1% by volume of the as-cast flexible tape layer, i.e., less than about 1% by volume of the tape layer after some additives are removed after the formation of the tape layer.

To aid in maintaining structural cohesiveness or integrity of the as-cast tape, in some embodiments, one or more organic binders such as, but not limited to polyvinyl butyral, polyvinyl alcohol, etc., are included in the slurry composition. In addition, the slurry composition includes one or more plasticizers in order to increase the flexibility of the ceramic tape. Examples of suitable plasticizers include polyethylene glycol, fatty acids, and combinations thereof.

In some embodiments, different combinations of surfactants/dispersants, binders, and plasticizers may be used in forming a flexible tape layer. An exemplary composition of a slurry for a flexible tape layer comprises a SiC powder, water as a liquid vehicle, polyvinyl alcohol as a dispersant and binder, and polyethylene glycol as a plasticizer. Another exemplary composition comprises methyl ethyl ketone as a liquid vehicle, polyvinyl alcohol and/or BYK-110 as a dispersant, polyvinyl butyral as an organic binder, and fatty acids as plasticizers. In some embodiments, to form a protective ceramic layer from a slurry (tape) composition comprising a ceramic powder and organic additives such as but not limited to at least one dispersant and/or surfactant, at least one organic binder, and/or at least one plasticizer, the tape may be exposed to heat to substantially volatilize the organic additives before the melt infiltration stage of the CMC component fabrication process.

The application of a flexible tape layer 110 onto a ceramic fiber preform 120 to produce a CMC component 130 with one or more protective ceramic layer(s) 140, such as the exemplary embodiment of a CMC component 130 formed using a single tape overlay, may be accomplished via several methods. For example, the tape layer 110 and the ceramic fiber preform 120 may be formed separately and the application of the tape layer 110 onto the ceramic fiber preform 120 may be done after both are formed. For example, the slurry composition for the flexible tape layer 110 may be cast onto a polyester sheet (e.g., a silicone coated Mylar sheet) and heated to form a dried tape layer. Such a dried tape layer may be retackified, for example by applying sufficient vapor of the same composition as the slurry vehicle solvent used in the preparation of the slurry for the tape layer. In some embodiments, the tape may be rewetted to allow application and bonding to the ceramic fiber preform 120. For example, the rewetted flexible tape layer may be adhered to the ceramic fiber preform 120 (before or after slurry infiltration) by heating at a temperature of less than about 212° F. and/or by applying a pressure of less than about 1000 psi.

In some embodiments, the application of the flexible tape layer 110 to a ceramic fiber preform 120 may occur alongside the process to fabricate the ceramic fiber preform 120. For example, the application may occur after the fiber rigidization stage of fabrication of the ceramic fiber preform, in tandem with or after slurry infiltration, and/or prior to the silicon melt infiltration process used to densify the CMC component.

In an exemplary embodiment, the formation of a the CMC component 130 including the protective ceramic layer 140 may be accomplished by wrapping, fully or partially, the slurry cast ceramic fiber preform (e.g., which may be solidified) with the tape layer, and bonding the tape layer to the ceramic fiber preform. For example, a combination of heat and pressure may be applied to cause the bonding of the tape layer to the ceramic fiber preform. A suitable consolidation temperature may be at or near the glass transition temperature of the binder so that the binder in the slurry composition for the flexible tape layer exhibits some flow. A suitable consolidation pressure may be pressure sufficient enough to cause rearrangement of ceramic powder particles and allow the formation of bond between the tape overlay 110 and the ceramic fiber preform 120. In some embodiments, the entire structure of a ceramic fiber preform and a tape overlay may then be densified by melt infiltration (e.g., silicon melt infiltration) to form the CMC component 130 including the protective ceramic layer 140.

Figure 2:
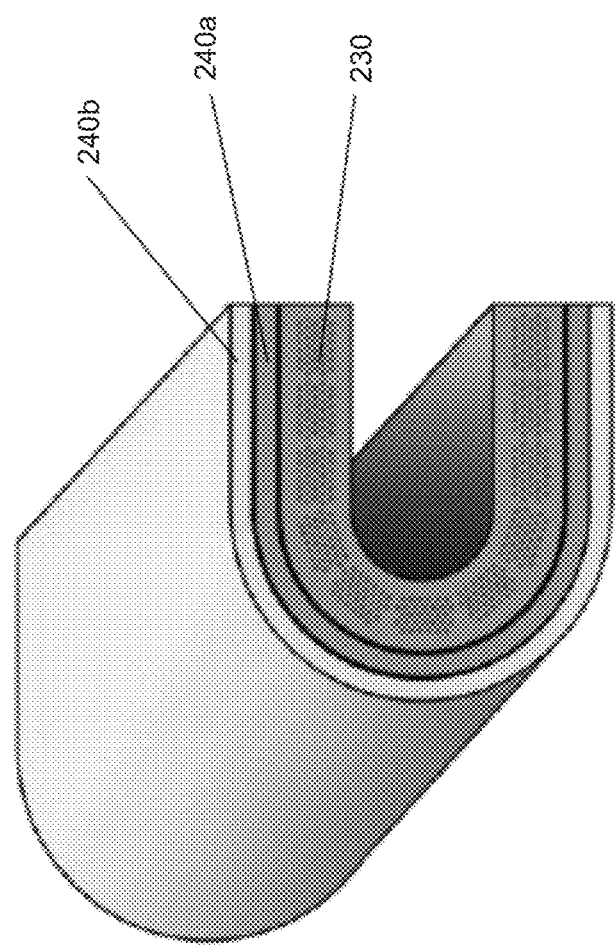
FIG. 2 shows a schematic representation of a ceramic matrix composite component with multiple flexible ceramic tape overlays.

FIG. 2 shows a schematic representation of a ceramic matrix composite component 230 formed with multiple flexible ceramic tape overlays to have two protective ceramic layers 240a, 240b in an overlying configuration. In some embodiments, an additional flexible tape layer may be applied to an already partially or fully tape-layer-overlaid ceramic fiber preform. For example, a second tape layer may be overlaid partially or fully onto a flexible ceramic tape layer that is bonded to at least a portion of the ceramic fiber preform. In such embodiments, appropriate consolidation pressure and/or temperature may be applied to the second layer, the already tape-layer-overlaid ceramic fiber preform and/or the tape layer already bonded to the ceramic fiber preform to cause bonding between the second tape layer and the tape layer that is already partially or fully overlaid onto the ceramic fiber preform. In some embodiments, several layers of a flexible ceramic tape layer may be applied to a ceramic fiber preform. For example, a third layer of flexible ceramic tape layer may be bonded to a second flexible ceramic tape layer that is already bonded to a first flexible ceramic tape layer that is already bonded to a ceramic fiber preform. As another example, a fourth layer of flexible ceramic tape layer may be bonded to a third ceramic tape layer that is bonded to a second flexible ceramic tape layer that is bonded to a first flexible ceramic tape layer that is already bonded to a ceramic fiber preform, and so on.

Exemplary processes for the preparation of a slurry composition, fabrication of a flexible ceramic tape from said slurry composition, and application of said tape layer to a ceramic fiber preform are now described for illustration purposes, and it should be understood that none is limited to the particular steps discussed herein. Exemplary methods begin with ceramic particles, such as but not limited to SiC, suspended in a liquid vehicle. In some embodiments, the ceramic powder may comprise one or more other ceramic component additives as well, such as but not limited to rare earth and hafnium borides and carbides. In some preferred embodiments, SiC may comprise about 50% to about 60% by volume of the as-cast tape. In some embodiments, a surfactant and/or dispersant may be added to the solvent-ceramic powder mix to aid in particle dispersion. The amount of the surfactant and/or dispersant is selected so as to maintain a low concentration of said surfactant and/or dispersant in the as-cast tape (e.g., less than 2%, less than 1%, etc., by volume of the as-cast tape). In some embodiments, the surfactant and/or dispersant may have low molecular weight. Examples of suitable surfactants and/or dispersants include polyvinyl alcohol and BYK®-110. Further, an organic binder, examples of which include polyvinyl butyral, polyvinyl alcohol, etc., may be added to allow the as-cast tape to retain a structural cohesiveness/integrity. In some embodiments, one or more plasticizers may be added that would allow the as-cast tape to retain a level of flexibility/pliability. Examples of suitable plasticizers include polyethylene glycol and fatty acids. The slurry composition comprising the ceramic powder, surfactants/dispersants, binders, and plasticizers may then be solidified to form a tape layer. In some embodiments, the drying characteristics of the solvent may be utilized in forming the tape layer from the slurry. For example, the slurry may be dried by heating it to a sufficient temperature to volatize the liquid vehicle to form a dried, flexible ceramic tape. For example, this may be done after casting the slurry onto a non-adhesive surface such as a silicone-coated polyester sheet (e.g., Mylar sheet). After heating, the removal of some or all the liquid vehicle from the slurry provides a dried, flexible tape layer. The formed tape layer may then be applied to a ceramic fiber preform in several ways, examples of which include autoclave lamination (i.e., heat and pressure) and retackification (i.e., rewetting with the liquid vehicle or a vapor of the liquid vehicle). For example, in autoclave lamination, the flexible tape is applied to the preform or slurry infiltrated preform, and then heated under mild temperature and pressure conditions, as described herein, to consolidate and adhere the flexible tape. Alternatively, in some other embodiments, the flexible tape may be retackified by applying a small amount of the liquid vehicle, either in liquid or vapor form, to the flexible tape, then the retackified tape may be applied to the preform or slurry infiltrated preform (as described herein) prior to silicon melt infiltration.

Figure 3:
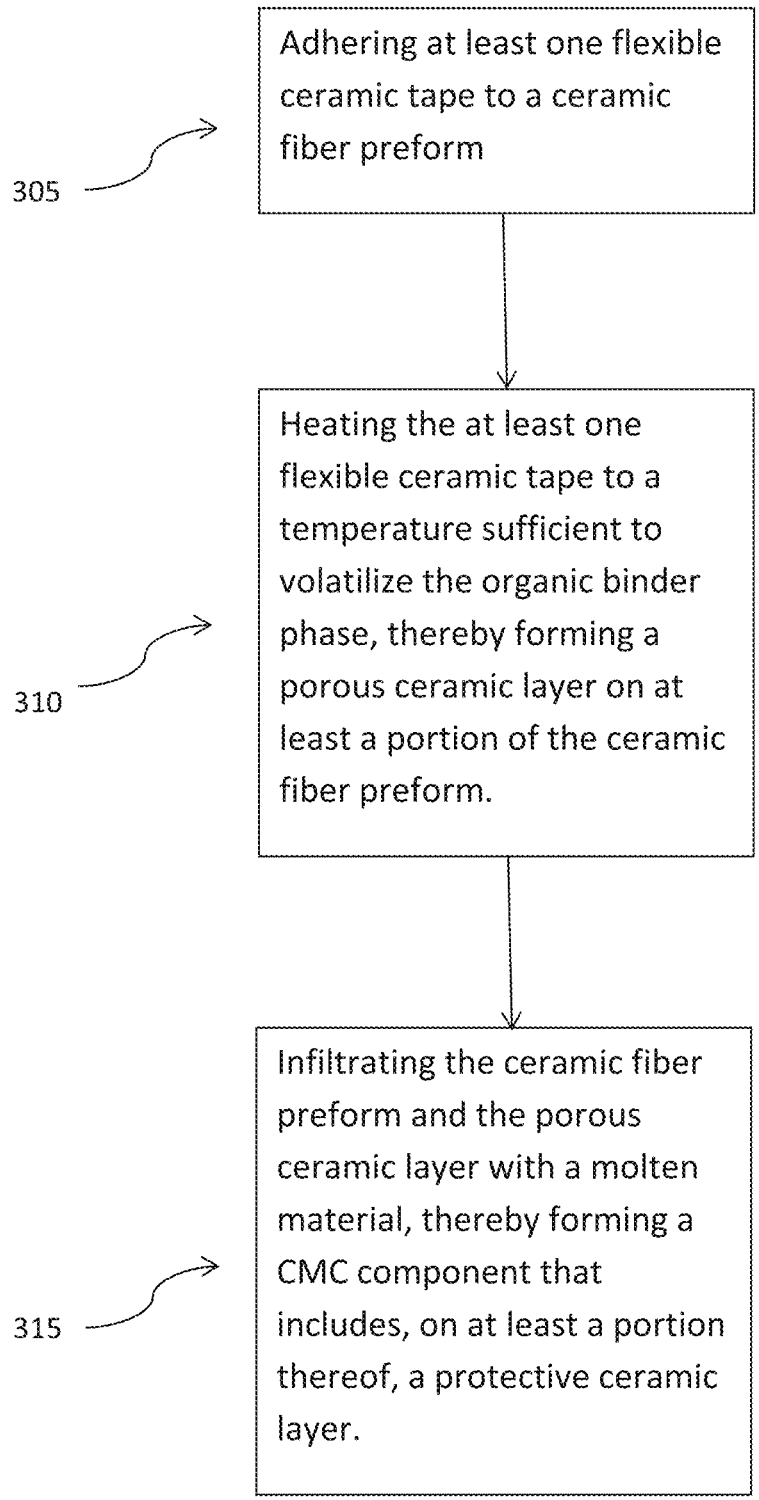
FIG. 3 is a flow chart showing exemplary steps of the method.

The method is now described in reference to the flow chart shown in FIG. 3. A process for preparing a ceramic matrix composite (CMC) component entails adhering 305 at least one flexible ceramic tape to a ceramic fiber preform. The ceramic fiber preform comprises a framework of ceramic fibers, which may be formed by lay-up of a plurality of woven or unwoven ceramic fibers. The ceramic fibers are preferably continuous ceramic fibers (e.g., continuous SiC fibers) suitable for weaving. The woven or unwoven ceramic fibers may be coated with an interphase coating (e.g., pyrolytic carbon or boron nitride (BN)) before or after the ceramic fiber preform is assembled. The interphase coating may serve as an interface between the fibers and the melt during melt infiltration and also as a compliant layer to enhance toughness and crack deflection in the CMC component. The ceramic fiber preform may be rigidized by applying a ceramic coating thereto using a process such as chemical vapor infiltration or another coating method known in the art. Thus, the ceramic fiber preform may be a rigidized ceramic fiber preform comprising coated ceramic fibers. The at least one flexible ceramic tape comprises ceramic particles dispersed in an organic binder phase. The organic binder phase may include one or more of the following: at least one surfactant or dispersant; at least one organic binder; and at least one plasticizer.

After the adhering step 305, the at least one flexible ceramic tape is heated to a temperature sufficient to volatilize 310 the organic binder phase, thereby forming a porous ceramic layer on at least a portion of the ceramic fiber preform. Typically, the temperature is in the range of 200° C. to about 900° C., or from about 300° C. to about 800° C.

After the heating and volatilizing 310, the ceramic fiber preform and the porous ceramic layer are infiltrated 315 with a molten material (melt infiltration), thereby forming a CMC component that includes, on at least a portion thereof, a protective ceramic layer. After melt infiltration, the CMC component comprises ceramic fibers in a densified ceramic matrix.

The CMC component may be a SiC/SiC composite, where the ceramic fibers comprise SiC fibers and the ceramic matrix comprises SiC. Before, during or after adhering 305 the at least one flexible ceramic tape to the preform, the preform may be infiltrated with a ceramic slurry comprising silicon carbide particles in a liquid carrier (e.g., an aqueous or organic solvent). The molten material used for melt infiltration 315 may comprise a silicon melt or a silicon alloy melt.

The adhering 305 may entail contacting the at least one flexible ceramic tape with the ceramic fiber preform and heating at a temperature at or above a glass transition temperature of the organic binder phase. Also or alternatively, the adhering 305 may entail, prior to contacting the at least one flexible ceramic tape with the ceramic fiber preform, rewetting the at least one flexible ceramic tape by exposure to an organic solvent or a vapor of the organic solvent.

The process may include one or more machining steps. For example, the porous ceramic layer may be machined prior to melt infiltration. Also or alternatively, the protective ceramic layer may be machined after melt infiltration. Typically, the protective ceramic layer has a thickness of from about 1 micron to about 5 mm, and is more typically from about 10 microns to about 1 mm, or from about 50 microns to about 800 microns. Advantageously, the protective ceramic layer may have a chemical composition different from the ceramic matrix of the CMC component. For example, the protective ceramic layer may comprise a silicate and/or borosilicate different from the silicon oxide of the ceramic matrix. The protective ceramic layer may exhibit increased water vapor resistance and/or hot corrosion resistance compared to the ceramic matrix. In some cases, the chemical composition of the protective ceramic layer may a functionally graded composition that varies across the thickness of the densified ceramic layer.

Two or more flexible ceramic tapes may be adhered to the ceramic fiber preform. Accordingly, two or more protective ceramic layers may be formed on the CMC component, where each layer has the same or a different chemical composition. The two or more protective ceramic layers may have an overlying configuration such that a multilayered ceramic coating on the CMC component is formed, as illustrated in FIG. 2. Alternatively, the two or more protective ceramic layers may not have an overlying configuration but rather may be disposed on different portions of the CMC component.

The ceramic particles of the flexible ceramic tape(s) may comprise silicon carbide and one or more ceramic component additives selected from the group consisting of: rare earth borides, hafnium borides, rare earth carbides, and hafnium carbides. The flexible ceramic tape(s) may be applied to all or a portion of an outer surface of the ceramic fiber preform. Also or alternatively, the flexible ceramic tape(s) may be applied to all or a portion of an inner surface of the ceramic fiber preform.

The formed tape layer may be applied to the ceramic fiber preform at different stages of the fabrication processes of the CMC component. For example, the formed tape layer may be applied to the ceramic fiber preform during or following the slurry infiltration process of the fabrication of the CMC component. Typically, the formed tape layer is applied after the ceramic fiber preform is formed but before the melt infiltration process.

In the exemplary embodiments where the formed tape layer is applied to the ceramic fiber preform in tandem with the slurry infiltration process, the tape layer may be applied to the preform, which may be a rigidized preform, and the combined structure may be slurry-infiltrated with the ceramic slurry. For example, the tape layer may be applied to just a portion of or the entirety of the preform, and the ceramic slurry may then infiltrate the porosity of the tape-fiber preform combined structure. In some embodiments, heat and/or pressure may be applied to the combined structure to allow for the formation of bond between the tape layer and the ceramic fiber preform. For example, a consolidation pressure may be applied to the combined structure to allow the formation of bonding between the ceramic fiber preform and the tape layer. For example, the pressure may be large enough to cause the rearrangement of particles in the tape layer and/or the ceramic fiber preform (assuming slurry infiltration has already been carried out). In some embodiments, the formed tape layer may be applied to the ceramic fiber preform following the slurry infiltration process. In such embodiments, the tape layer may be introduced to the slurry infiltrated ceramic fiber preform. For example, the tape layer may be used to fully or partially wrap around the slurry infiltrated preform. Heat and/or pressure may be applied to the combined structure to allow for the formation of bonds between the tape layer and the preform. For example, the heating may be at a temperature of less than about 212° F. and/or the pressure may be less than about 1000 psi. In both types of embodiments where the tape layer is applied to the ceramic fiber preform in tandem or after the slurry infiltration stage of the CMC component fabrication process, the combined structure may then be solidified by the process of silicon melt infiltration. For example, molten silicon may be introduced to the combined structure to fill the porosity in the structure and densify it.

In some embodiments, the tape layer may be applied to an already formed CMC component. In such embodiments, the dried tape layer may be retackified (or rewetted) by applying sufficient vapor of the flexible tape slurry solvent. As such, the dried flexible tape layer may be rewetted before applying it to the CMC component, whereby the rewetted tape layer and the CMC component are bonded together. For example, sufficient heat and/or sufficient pressure may be applied to the tape layer and/or the CMC component to cause a bonding between the protective tape layer and the CMC component. In some embodiments, once a CMC component is overlaid with a tape layer (e.g., during the formation of the CMC component, or to an already formed CMC component), additional layer or layers of flexible ceramic tape layer may be applied to the already tape-layer(s)-overlaid CMC component.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

Furthermore it should be understood that while the use of the word preferable, preferably, or preferred in the description above indicates that feature so described may be more desirable, it nonetheless may not be necessary and embodiment lacking the same may be contemplated as within the scope of the invention, that scope being defined by the claims that follow. In reading the claims it is intended that the words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary. All documents cited herein are hereby incorporated by reference in their entirety for all purposes.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A process for preparing a ceramic matrix composite (CMC) component including a protective ceramic layer, the process comprising:
   adhering at least one flexible ceramic tape to a rigidized ceramic fiber preform consisting of a framework of coated ceramic fibers, the at least one flexible ceramic tape comprising ceramic particles dispersed in an organic binder phase,
   after the adhering, infiltrating the rigidized ceramic fiber preform with a ceramic slurry comprising silicon carbide particles in a solvent;
   after the adhering, heating the at least one flexible ceramic tape to a temperature sufficient to volatilize the organic binder phase, thereby forming a porous ceramic layer on at least a portion of the rigidized ceramic fiber preform; and
   after the heating and volatilizing, infiltrating the rigidized ceramic fiber preform and the porous ceramic layer with a molten material, thereby forming a CMC component including, on at least a portion thereof, a protective ceramic layer,
   wherein the protective ceramic layer has a chemical composition different from a ceramic matrix of the CMC component.

2. The process of claim 1, wherein the rigidized ceramic fiber preform comprises SiC fibers, and wherein the molten material comprises a silicon melt or a silicon alloy melt.

3. The process of claim 1, wherein the adhering comprises contacting the at least one flexible ceramic tape with the rigidized ceramic fiber preform and heating at a temperature at or above a glass transition temperature of the organic binder phase.

4. The process of claim 1, wherein the adhering comprises rewetting the at least one flexible ceramic tape by exposure to an organic solvent or a vapor of the organic solvent, and then contacting the at least one flexible ceramic tape with the rigidized ceramic fiber preform.

5. The process of claim 1, further comprising machining the protective ceramic layer.

6. The process of claim 1, further comprising machining the porous ceramic layer prior to melt infiltration.

7. The process of claim 1, wherein the protective ceramic layer comprises increased water vapor resistance and/or hot corrosion resistance compared to the ceramic matrix.

8. The process of claim 1, wherein the chemical composition of the protective ceramic layer varies across a thickness thereof, the chemical composition being a functionally graded composition.

9. The process of claim 1, wherein two or more flexible ceramic tapes are adhered to the rigidized ceramic fiber preform.

10. The process of claim 9, wherein two or more protective ceramic layers are formed on the CMC component, each layer having the same or a different chemical composition.

11. The process of claim 10, wherein the two or more protective ceramic layers have an overlying configuration, thereby forming a multilayered ceramic coating on the CMC component.

12. The process of claim 10, wherein the two or more protective ceramic layers do not have an overlying configuration, the two or more protective ceramic layers being disposed on different portions of the CMC component.

13. The process of claim 1, wherein the ceramic particles of the at least one flexible ceramic tape comprise silicon carbide and one or more ceramic component additives selected from the group consisting of: rare earth borides, hafnium borides, rare earth carbides, and hafnium carbides.

14. The process of claim 1, wherein the at least one flexible ceramic tape is applied to all or a portion of an outer surface of the rigidized ceramic fiber preform.

15. The process of claim 1, wherein the at least one flexible ceramic tape is applied to all or a portion of an inner surface of the rigidized ceramic fiber preform.

16. The process of claim 1, wherein the protective ceramic layer comprises a thickness of from about 10 microns to about 1 mm.

* * * * *